United States Patent
Tanaka

(10) Patent No.: US 8,446,965 B2
(45) Date of Patent: May 21, 2013

(54) COMPRESSION NOISE REDUCTION APPARATUS, COMPRESSION NOISE REDUCTION METHOD, AND STORAGE MEDIUM THEREFOR

(75) Inventor: Takahiro Tanaka, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 304 days.

(21) Appl. No.: 13/024,097

(22) Filed: Feb. 9, 2011

(65) Prior Publication Data
US 2012/0027101 A1    Feb. 2, 2012

(30) Foreign Application Priority Data
Jul. 27, 2010  (JP) .................... 2010-168672

(51) Int. Cl.
*H04N 7/12*  (2006.01)
(52) U.S. Cl.
USPC .................................................. 375/240.29
(58) Field of Classification Search
USPC .......................... 375/240.01, 240.29
See application file for complete search history.

(56) References Cited

U.S. PATENT DOCUMENTS
2006/0222259 A1   10/2006   Obara

FOREIGN PATENT DOCUMENTS

| JP | 2-056179 | 2/1990 |
|---|---|---|
| JP | 9-247674 | 9/1997 |
| JP | 2003153262 | 5/2003 |
| JP | 2005117449 | 4/2005 |
| JP | 2006279709 | 10/2006 |
| JP | 2008153812 | 7/2008 |
| JP | 2008278185 | 11/2008 |

OTHER PUBLICATIONS

Japanese Patent Application No. 2010-168672, Notice of Examiner's Reasons for Rejection, mailed Apr. 19, 2011, (English Translation).

*Primary Examiner* — Young Lee
(74) *Attorney, Agent, or Firm* — Blakely, Sokoloff, Taylor & Zafman LLP

(57) ABSTRACT

A compression noise reduction apparatus includes a peripheral pixel state determination module, a filter strength determination module, and a deringing processing module. The peripheral pixel state determination module determines a state of a flat area and an edge area at a periphery of a filtering target pixel in decoded image. The filter strength determination module determines a filter strength to be used in filter processing in accordance with the state of the flat area and the edge area. The deringing processing module performs deringing processing using the determined filter strength.

6 Claims, 4 Drawing Sheets

COMPRESSION NOISE REDUCTION APPARATUS, COMPRESSION NOISE REDUCTION METHOD, AND STORAGE MEDIUM THEREFOR

CROSS-REFERENCE TO RELATED APPLICATIONS

This application is based upon and claims the benefit of priority from the Japanese Patent Application No. 2010-168672 filed on Jul. 27, 2010, the entire contents of which are incorporated herein by reference.

FIELD

An embodiment relates to a compression noise reduction apparatus, a compression noise reduction method, and a storage medium therefor.

BACKGROUND

In recent years, MPEG-2, H.264 and the like are widely used as image coding methods in the fields of broadcasting, communication, and storage.

Problems that arise when playing back images encoded according to these coding methods include block noise and ringing. Conventional methods that are performed to reduce such block noise or ringing include a method that adjusts a filter strength utilizing coding information at a noise reduction module, and a method that controls a threshold of an ε-filter in accordance with a difference in pixel values between adjoining pixels, that is, the edge strength.

However, when using coding information for noise reduction, a mechanism for passing coding information between a decoder and a noise reduction module is required.

Further, because the coding information depends on the performance of the encoder, there is a problem that unless accurate coding information, for example, accurate motion vector information, is obtained, appropriate noise reduction cannot be performed.

In addition, since each coding information differs if coding methods are different, there is also a problem that a noise reduction module for a specific coding method can not be applied as it is to another coding method.

Further, when a threshold of an ε-filter is controlled in accordance only with an edge strength, there is a problem that the sharpness of an image is lost and the image quality of a playback image decreases.

DETAILED DESCRIPTION

A compression noise reduction apparatus according to an embodiment includes a peripheral pixel state determination module, a filter strength determination module, and a deringing processing module. The peripheral pixel state determination module is configured to determine a state of a flat area and an edge area at a periphery of a filtering target pixel in decoded image. The filter strength determination module is configured to determine a filter strength to be used in filter processing in accordance with the state of the flat area and the edge area. The deringing processing module is configured to perform deringing processing using the determined filter strength.

The embodiment is described hereinafter with reference to the drawings.

(Overall Configuration)

Figure 1:
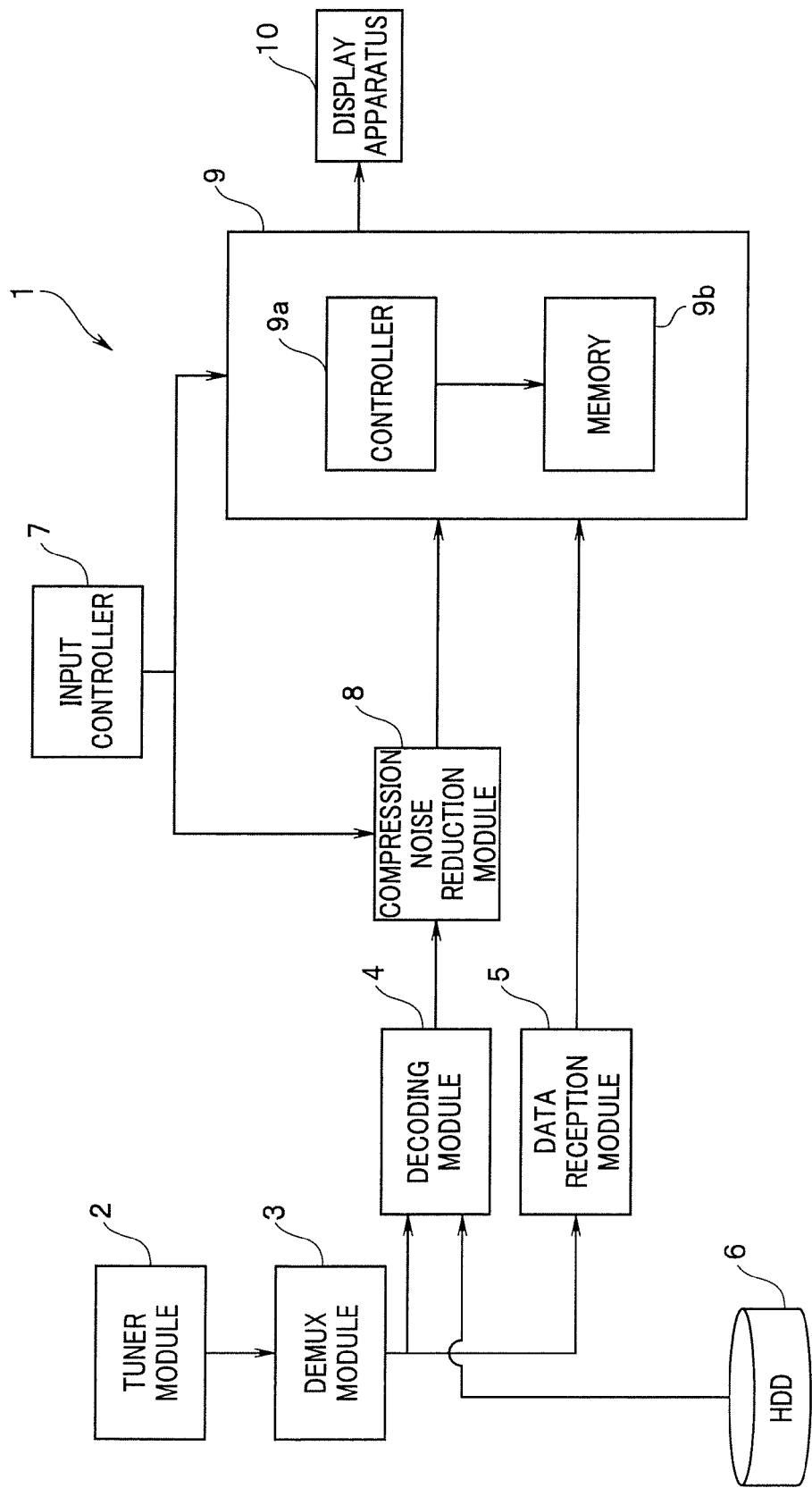
FIG. 1 is a block diagram that illustrates the configuration of a digital broadcast receiver 1 according to an embodiment.

First, the configuration of a digital broadcast receiver according to the present embodiment is described based on FIG. 1. FIG. 1 is a block diagram illustrating the configuration of a digital broadcast receiver 1 according to the present embodiment.

The digital broadcast receiver 1 that is a television receiver includes a tuner module 2, a demultiplexer module (hereinafter, referred to as "DEMUX module") 3, a decoding module 4, a data reception module 5, a hard disk drive (hereinafter, referred to as "HDD") 6, an input controller 7, a compression noise reduction module 8, an output controller 9, and a display apparatus 10 as a video output module. The output controller 9 includes a controller 9a that has a CPU, and a memory 9b.

The tuner module 2 is a circuit configured to receive digital broadcast signals from an unshown antenna.

The DEMUX module 3 is a circuit configured to separate reception signals from the tuner module 2 into respective video, audio, and data signals. The video signals are input to the decoding module 4. Data signals such as an electronic program guide (hereinafter, referred to as "EPG") signals are input to the data reception module 5. Audio signals are input to an unshown audio processing module.

The decoding module 4 decodes input video signals, and generates plural frame images.

The data reception module 5 subjects received data signals to predetermined processing. For example, the data reception module 5 includes a CPU or the like, and processes EPG data to generate data of video signals relating to program listings.

The HDD 6 is a storage module in which video contents that have been encoded by a predetermined coding method are recorded. Hence, the decoding module 4 is capable of decoding broadcast data received via the DEMUX module 3 and video signals of stored data that has been recorded on the HDD 6. A user, for example, can operate a remote control device to perform decoding, i.e. playback, of encoded images in broadcast data or in stored data.

The input controller 7 is configured to process an operation signal from an unshown remote control device or an operation switch of a main body panel of the digital broadcast receiver 1 or the like, and supply a processing instruction signal to respective processing modules such as the tuner module 2. In this connection, although FIG. 1 illustrates an example in which processing instruction signals from the input controller 7 are supplied to the compression noise reduction module 8 and the output controller 9 that are related to the present embodiment, the processing instruction signals are also supplied to other processing modules.

Video signals that have been decoded at the decoding module 4 are output to the compression noise reduction module 8. The compression noise reduction module 8 performs noise reduction processing as described later based on a processing instruction signal from the input controller 7.

The output controller 9 receives data that is input from the compression noise reduction module 8 and the data reception module 5, and performs data processing to output the data to the display apparatus 10. The controller 9a is a processing module configured to receive a processing instruction signal input from the input controller 7 and control writing of various kinds of data to the memory 9b. Data of various video signals to be output to the display apparatus 10 is stored in the memory 9b. The controller 9a controls writing of data to the memory 9b in accordance with an instruction signal from the input controller 7, generates video signals to be displayed, and outputs the video signals to the display apparatus 10.

(Configuration of Compression Noise Reduction Module)

Figure 2:
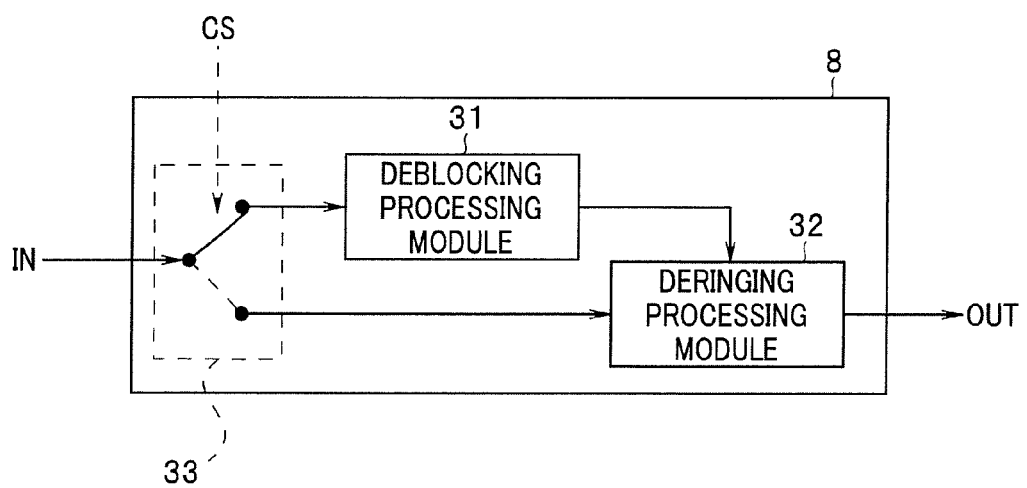
FIG. 2 is a block diagram that illustrates the configuration of a compression noise reduction module 8 according to the embodiment.

FIG. 2 is a block diagram that illustrates the configuration of the compression noise reduction module 8 of the present embodiment.

The compression noise reduction module 8 has a deblocking processing module 31 and a deringing processing module 32. An input image signal IN is input to the compression noise reduction module 8, and the compression noise reduction module 8 outputs an output image signal OUT.

The input image signal IN is an image signal that is decoded and generated at the decoding module 4. The input image signal IN is input to the deblocking processing module 31. The deblocking processing module 31 subjects the input image signal IN to deblocking processing, that is, block noise reduction processing. The image signal that has undergone deblocking processing is input to the deringing processing module 32.

The deringing processing module 32 subjects the input image signal to deringing processing, that is, ringing reduction processing. The deringing processing module 32 outputs an output image signal OUT that has undergone deringing processing.

In the case of image signals encoded using a coding method including a deblocking filter, that is, an in-loop filter, such as H.264, since it is not necessary to perform deblocking processing, the compression noise reduction module 8 may be configured so that the input image signal IN is input through a switch module 33, as indicated by the dotted line in FIG. 2. Thus, for example, when decoding of an image signal that has been encoded by H.264 is instructed from the remote control device, the switch module 33 is switched in accordance with the instruction signal CS. In that case, as indicated by the dotted line in FIG. 2, the switch module 33 is switched so as to directly input the input image signal IN to the deringing processing module 32.

Although each processing module shown in FIG. 2 is implemented with a software program according to the present embodiment, each processing module may also be implemented with a hardware circuit. In the following description, an example is described in which the compression noise reduction module 8 as a compression noise reduction apparatus is mounted inside a semiconductor device including a CPU together with the other processing modules, and is implemented with a software program.

(Deblocking Processing Module)

Figure 3:
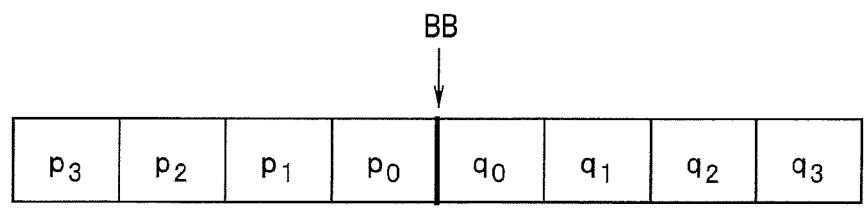
FIG. 3 is a view for describing an example of plural pixels in the vicinity of a pixel block boundary according to the embodiment.

FIG. 3 is a view for describing an example of plural pixels in the vicinity of a pixel block boundary. FIG. 3 shows, for example, eight pixels at a boundary between blocks consisting of 8×8 pixels that is the minimum unit of MPEG-2 coding. In FIG. 3, a center part of the eight pixels in a decoded image is a pixel block boundary BB in the vertical direction, and the pixel values of the 8 pixels are $p_3$, $p_2$, $P_1$, $p_0$, $q_0$, $q_1$, $q_2$, and $q_3$, respectively.

Figure 4:
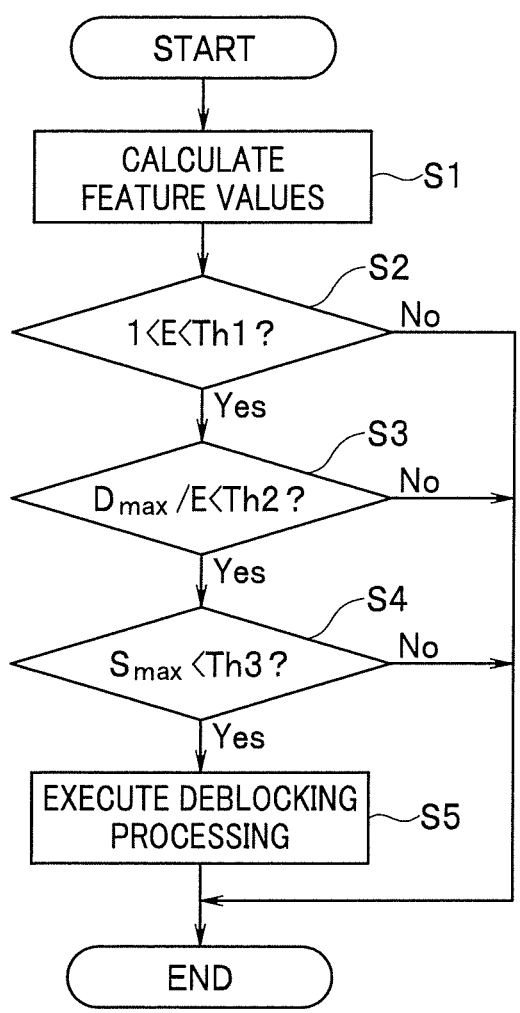
FIG. 4 is a flowchart that illustrates an example of processing of a deblocking processing module 31 according to the embodiment.

FIG. 4 is a flowchart that illustrates an example of processing of the deblocking processing module 31. The following processing is performed with the 8-pixel unit shown in FIG. 3 from, for example, a pixel block boundary on the upper left in the image.

First, the CPU calculates predetermined feature values for predetermined eight pixels at a predetermined pixel block boundary BB in an image relating to the input image signal IN (step (hereinafter, abbreviated to "S") 1).

The predetermined feature values calculated here are a block noise strength E, a maximum variation in the boundary vicinity $D_{max}$, and a maximum slope in the boundary vicinity $S_{max}$. The respective feature values are calculated based on the following equations using the pixel values $p_3$ to $q_3$ in the boundary vicinity. In equation (2) and equation (3), "max" is a function that determines a maximum value.

$$E=|p_0-q_0| \quad \text{equation (1)}$$

$$D_{max}=\max(|p_3-p_2|, |p_2-p_1|, |p_1-p_0|, |q_0-q_1|, |q_1-q_2|, |q_2-q_3|) \quad \text{equation (2)}$$

$$S_{max}=\max(|p_0-p_3|, |q_3-q_0|) \quad \text{equation (3)}$$

In this connection, it is desirable that the pixel block size that serves as the boundary in FIG. 3 be the same as the size of a block noise generated by coding. For example, when the minimum unit of coding is a block size of 4×4 pixels as in H.264, it is better that the pixel block in FIG. 3 be any of the sizes 4×4, 8×8, and 16×16.

Next, it is determined whether or not a block noise occurs at the pixel block boundary, based on the above described three feature values E, $D_{max}$, and $S_{max}$.

First, it is determined whether or not E is greater than 1 and less than a predetermined threshold Th1 (S2). E shows an absolute difference between two adjacent pixels with the pixel values $p_0$ and $q_0$ at the pixel block boundary BB. In S2, when there are 255 gradations, a threshold "1" indicates a gradation difference of 1/255. When the threshold Th1 is, for example, 40, it indicates a gradation difference of 40/255.

If the result determined in S2 is "No", it indicates that there is almost no difference in the pixel values, or that there is a large difference in the pixel values and the pixel block boundary BB is a boundary between two objects in the image.

Next, it is determined whether or not ($D_{max}/E$) is less than a predetermined threshold Th2 (S3).

$D_{max}$ is a maximum value among an absolute difference between pixel values of a set of three adjacent pixels among the four pixels $p_3$, $p_2$, $p_1$ and $p_0$ included in one pixel block of the pixel block boundary BB, and an absolute difference between pixel values of a set of three adjacent pixels among the four pixels $q_0$, $q_1$, $q_2$, and $q_3$ included in another pixel block thereof. Hence, $D_{max}$ is a feature value that indicates how flat the periphery of the pixel block boundary BB is, or whether the periphery of the pixel block boundary BB is not flat.

($D_{max}/E$) shows a ratio of a maximum value ($D_{max}$) of a difference in peripheral pixel values with respect to a difference (E) in pixel values of two adjoining pixels at the pixel block boundary BB.

When ($D_{max}/E$) is greater than or equal to the predetermined threshold Th2, it means that the vicinity of the pixel block boundary BB is not a flat image. The threshold Th2 is, for example, 0.6.

Next, it is determined whether or not $S_{max}$ is less than a predetermined threshold Th3 (S4). $S_{max}$ is the larger value among an absolute difference between the pixels $p_3$ and $p_0$ at the two ends of pixels ($p_3$, $p_2$, $p_1$, $p_0$) on the left side of the pixel block boundary BB and an absolute difference between the pixels $q_0$ and $q_3$ at the two ends of pixels ($q_0$, $q_1$, $q_2$, $q_3$) on the right side of the pixel block boundary BB. $S_{max}$ shows the maximum slope in the vicinity of the pixel block boundary BB.

When $S_{max}$ is greater than or equal to the predetermined threshold Th3, it means that the vicinity of the pixel block boundary BB is a gradation portion. The threshold Th3 is, for example, 20.

When the result determined in S4 is "Yes", more specifically, when a pixel value difference of the pixel block boundary BB is somewhat large, the image in the vicinity of the pixel block boundary BB is flat and, further, the vicinity of the pixel block boundary BB is not a gradation region, it is determined that a block noise has occurred and the processing advances to S5.

In S5, deblocking processing is performed with respect to at least two pixels including $p_0$ and $q_0$ among the respective pixel values $p_3$ to $q_3$ in the boundary vicinity. The deblocking processing applies a one-dimensional ϵ-filter that takes as the threshold a value E that is calculated with a predetermined number of taps. Since the filter strength is adaptively controlled by taking E as the threshold for the one-dimensional ϵ-filter, it is not necessary to adjust the number of taps and filter coefficients according to the block noise strength.

The above described processing is for a given eight pixels of the pixel block boundary BB in the vertical direction. The processing of FIG. 4 is performed for all the pixel block boundaries. The deblocking processing in the horizontal direction is performed in the manner described above.

After the processing illustrated in FIG. 4 is completed for all the pixel block boundaries in the vertical direction, more specifically, after deblocking processing in the horizontal direction is completed, the processing in FIG. 4 is executed for all the pixel block boundaries in the horizontal direction.

The processing contents of deblocking processing for the pixel block boundaries in the horizontal direction (that is, deblocking processing in the vertical direction) are the same as for the deblocking processing in the horizontal direction, except that the block boundary exists in the horizontal direction.

Note that the order of processing in the vertical direction and the horizontal direction may be the reverse of the above described order.

Further, when the input image signal IN is an image according to an interlaced system, it is preferable to adopt a configuration that performs the above described processing for each field. In that case, since the resolution in the vertical direction is halved, the number of taps and number of filtering target pixels may be reduced compared to when performing deblocking processing in the horizontal direction.

(Deringing Processing)

Figure 5:
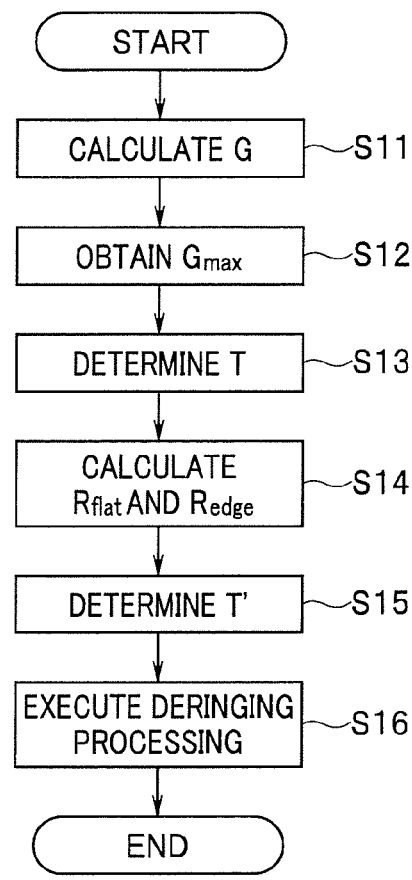
FIG. 5 is a flowchart that illustrates an example of processing of a deringing processing module 32 according to the embodiment.

Next, the deringing processing module 32 is described. FIG. 5 is a flowchart that illustrates an example of processing of the deringing processing module 32.

First, a pixel gradient G is calculated for each pixel of the input image signal IN (S11). The pixel gradient G is calculated based on the following equation (4) using a pixel value val of the relevant pixel, as well as pixel values $val_{top}$, $val_{btm}$, $val_{lft}$, and $val_{rgt}$ of pixels adjoining the relevant pixel on the top, bottom, left, and right thereof.

$$G=\max(|val_{top}-val|, |val_{btm}-val|, |val_{lft}-val|, |val_{rgt}-val|) \quad \text{equation (4)}$$

More specifically, the pixel gradient G is the maximum value among absolute differences between the relevant pixel and the respective pixels on the top, bottom, left, and right thereof. Since equation (4) includes only a difference operation and a comparison operation, calculation of the equation can be executed at a high speed by the CPU.

A configuration may also be adopted in which the pixel gradient G is calculated as a root sum of squared differences using the pixel value of the relevant pixel and the respective pixel values of two pixels below and on the right of the relevant pixel as shown by the following equation (5).

$$G=\sqrt{(val_{btm}-val)^2+(val_{rgt}-val)^2} \quad \text{equation (5)}$$

In this connection, the pixel gradient G may also be defined by an operational expression other than equation (4) and equation (5).

Next, surrounding M×M pixels including the relevant pixel are retrieved, and a maximum value $G_{max}$ of the pixel gradient G within the M×M pixels is obtained (S12). Preferably, the higher the resolution of the input image signal IN, the higher the value that is given to M. For example, M is 8 for an HD image.

Note that a maximum value acquired for each predetermined pixel block, and not for each pixel, may also be used as the maximum value $G_{max}$.

Figure 6:
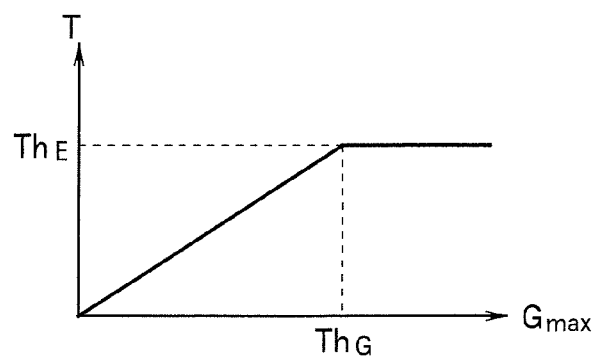
FIG. 6 is a view that illustrates the relation between a maximum value $G_{max}$ and a threshold T according to the embodiment.

Next, a threshold T with respect to $G_{max}$ is determined using the relation between the maximum value $G_{max}$ and the threshold T shown in FIG. 6 (S13). The threshold T serves as a threshold of a two-dimensional ϵ-filter that is described later. The threshold T is the upper limit of the filter strength.

Parameters $Th_E$ and $Th_G$ shown in FIG. 6 are parameters for adjusting the size of the overall noise reduction effect. The parameters $Th_E$ and $Th_G$ are preset. As shown in FIG. 6, when $G_{max}$ is between 0 and the threshold $Th_G$, T increases in accordance with an increase in $G_{max}$, and hence the filter strength increases. When $G_{max}$ exceeds the threshold $Th_G$, T becomes a constant value. The noise reduction effect increases in accordance with a decrease in $Th_G$ unless $Th_E$ changes. Further, the noise reduction effect increases in accordance with an increase in $Th_E$ unless $Th_G$ changes.

Next, a flatness ratio $R_{flat}$ and an edge ratio $R_{edge}$ are calculated (S14). The flatness ratio $R_{flat}$ and the edge ratio $R_{edge}$ are each a value between 0 and 1. The processing in S14 constitutes a peripheral pixel state determination module that determines a state of a flat area and an edge area at the periphery of a filtering target pixel.

The flatness ratio $R_{flat}$ is a ratio of pixels at which the pixel gradient G becomes less than or equal to a threshold $Th_{flat}$ when P×P pixels at the periphery of the relevant pixel are retrieved. For example, P is 20. When the flatness ratio $R_{flat}$ is a high ratio, it means that P×P pixels include many pixels have the pixel gradient G which is less than or equal to the threshold $Th_{flat}$, in other words, there are many flat areas. The threshold $Th_{flat}$ is, for example, 5.

The edge ratio $R_{edge}$ is a ratio of pixels at which the pixel gradient G becomes greater than or equal to a threshold $Th_{edge}$ when Q×Q pixels at the periphery of the relevant pixel are retrieved. For example, Q is 20. When the edge ratio $R_{edge}$ is a high ratio, it means that Q×Q pixels of edge areas having the pixel gradient G which is greater than or equal to the threshold $Th_{edge}$, in other words, there are many edge areas. The threshold $Th_{edge}$ is, for example, 50.

In this connection, preferably the relation between M, P, and Q that are defined here as retrieval ranges, is M≦P≦Q.

Next, a threshold T' corresponding to $G_{max}$ is determined (S15). The threshold T' is determined in the following manner.

First, the larger value is selected from among values obtained by multiplying the flatness ratio $R_{flat}$ and the edge ratio $R_{edge}$ obtained as described above by predetermined weighting coefficients, respectively. More specifically, the larger ratio R is obtained from the following equation (6).

$$R = \max(R_{flat} \times W_{flat}, R_{edge} \times W_{edge}) \quad \text{equation (6)}$$

Here, $W_{flat}$ and $W_{edge}$ are weighting coefficients for the flatness ratio $R_{flat}$ and the edge ratio $R_{edge}$, respectively.

Subsequently, the threshold T' is determined from the following equations (S15). The processing in S15 constitutes a filter strength determination module that determines a filter strength used in filter processing in accordance with the state of the flat areas and edge areas.

$$T' = R \times G_{max} \times (Th_E / Th_G) \quad \text{equation (7)}$$

$$T' = \text{clip}(T', 0, T) \quad \text{equation (8)}$$

The term "clip" in equation (8) represents a function that makes T' that is obtained with equation (7) fall within a range of 0 to T (that is, clips T' to within the range 0 to T). Hence, T' does not exceed the value of T.

The CPU carries out deringing processing with respect to the relevant pixel using the value T' obtained as described above as a threshold of a two dimensional ε-filter (S16). The processing in S16 constitutes a deringing processing module that carries out deringing processing using the filter strength that has been determined.

As described above, according to the aforementioned S12 and S13, the threshold T that is a filter strength that serves as an upper limit is determined so that strong smoothing is applied to the pixels at the periphery of a strong edge at which ringing is considered to be occurring.

Further, according to the aforementioned S14 and S15, the state of a flat area and an edge area at the periphery of a filtering target pixel is determined based on the flatness ratio $R_{flat}$ and the edge ratio $R_{edge}$, and a filter strength for deringing processing is determined in accordance with those states. As a result, ringing can be reduced while preventing the loss of a fine texture signal at the edge periphery.

As described above, according to the compression noise reduction apparatus of the present embodiment, since the filter strength is adaptively controlled by utilizing predetermined feature values for a decoded image without using coding information, a decline in image quality can be suppressed. In addition, according to the digital broadcast receiver of the present embodiment, since coding information is not used, a mechanism that passes coding information between a decoder and a noise reduction module is not required and, furthermore, the noise reduction effect is not influenced by the performance of the encoder.

Further, since the filter strength is controlled by utilizing feature values of a decoded image, the above described compression noise reduction apparatus is also applicable to apparatuses that employ different coding methods, and thus the compression noise reduction apparatus can be applied to a variety of uses. Furthermore, since the respective expressions described above are used, an algorithm for reducing compression noise is relatively simple, and this leads to acceleration of the noise reduction processing.

Although in the foregoing description a television receiver is taken as an example of an apparatus to which the compression noise reduction apparatus is mounted, the above described compression noise reduction apparatus can also be applied to an apparatus that plays back encoded images, such as a DVD player, a Blu-ray player, and an HDD recorder.

The whole or a part of a software program that executes the operations described above is a computer program product recorded or stored in a storage medium, such as a portable medium like a flexible disk or a CD-ROM, or a hard disk drive. A computer reads the program to execute all or a part of the operations. Alternatively, the whole or a part of the program can be distributed or provided through a communication network. A user can easily implement the compression noise reduction apparatus and the method thereof of the present embodiment by downloading the program through the communication network and installing the program in a computer, or installing the program in a computer from a storage medium.

While a certain embodiment has been described, the embodiment has been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A compression noise reduction apparatus, comprising:
   a deblocking processing module configured to perform deblocking processing with respect to a decoded image;
   a peripheral pixel state determination module configured to determine a ratio of flat pixels and a ratio of edge pixels of a plurality of pixels, based on a pixel gradient of the plurality of pixels at a periphery of a filtering target pixel in the image that has been subjected to the deblocking processing at the deblocking processing module;
   a filter strength determination module configured to determine a filter strength such that the filter strength to be used in filter processing increases, as the ratio of the flat pixels or the ratio of the edge pixels becomes greater, in accordance with the ratio of the flat pixels and the ratio of the edge pixels; and
   a deringing processing module configured to determine a maximum value of pixel gradients of pixels within a predetermined range around the filtering target pixel, and to perform deringing processing using the determined filter strength by taking a value set in advance according to the maximum value as an upper limit of the filter strength.

2. The compression noise reduction apparatus according to claim 1, wherein the ratio of the flat pixels is a ratio of pixels at which the pixel gradient of peripheral pixels of the filtering target pixel becomes less than or equal to a predetermined first threshold.

3. The compression noise reduction apparatus according to claim 2, wherein the ratio of the edge pixels is a ratio of pixels at which the pixel gradient of peripheral pixels of the filtering target pixel becomes greater than or equal to a predetermined second threshold.

4. The compression noise reduction apparatus according to claim 3, wherein the filter strength is determined based on a value which is larger among a value obtained by weighting the ratio of flat pixels according to a predetermined first coefficient and a value obtained by weighting the ratio of edge pixels according to a predetermined second coefficient.

5. A compression noise reduction method, comprising:
   performing deblocking processing with respect to a decoded image;
   determining a ratio of flat pixels and a ratio of edge pixels of a plurality of pixels, based on a pixel gradient of the plurality of pixels at a periphery of a filtering target pixel in the image that has been subjected to the deblocking processing;

determining a filter strength such that the filter strength to be used in filter processing increases, as the ratio of the flat pixels or the ratio of the edge pixels becomes greater, in accordance with the ratio of the flat pixels and the ratio of the edge pixels; and determining a maximum value of pixel gradients of pixels within a predetermined range around the filtering target pixel, and performing deringing processing using the determined filter strength by taking a value set in advance according to the maximum value as an upper limit of the filter strength.

6. A non-transitory computer-readable storage medium that stores a program configured to reduce a compression noise of decoded image, wherein the program causes a computer to perform operations comprising:

performing deblocking processing with respect to a decoded image;

determining a ratio of flat pixels and a ratio of edge pixels of a plurality of pixels, based on a pixel gradient of the plurality of pixels at a periphery of a filtering target pixel in the image that has been subjected to the deblocking processing;

determining a filter strength such that the filter strength to be used in filter processing increases, as the ratio of the flat pixels or the ratio of the edge pixels becomes greater, in accordance with the ratio of the flat pixels and the ratio of the edge pixels; and determining a maximum value of pixel gradients of pixels within a predetermined range around the filtering target pixel, and performing deringing processing using the determined filter strength by taking a value set in advance according to the maximum value as an upper limit of the filter strength.

* * * * *